United States Patent [19]

Randin et al.

[11] Patent Number: 4,822,694

[45] Date of Patent: Apr. 18, 1989

[54] COMPOSITE MATERIAL

[75] Inventors: Jean-Paul Randin, Cortaillod; Ludwig Gauckler, Schaffhausen, both of Switzerland

[73] Assignee: Asulab S.A., Bienne, Switzerland

[21] Appl. No.: 116,173

[22] Filed: Nov. 3, 1987

[30] Foreign Application Priority Data

Nov. 3, 1986 [FR] France ................... 86 15380

[51] Int. Cl.⁴ .................... B32B 3/26; B05D 5/00
[52] U.S. Cl. .................... 428/615; 428/304.4; 428/314.4; 427/230; 427/244
[58] Field of Search ......... 428/613, 614, 615, 539.5, 428/304.4, 314.4; 427/230, 244

[56] References Cited

U.S. PATENT DOCUMENTS

| 1,328,833 | 1/1920 | Hasburg . | |
|---|---|---|---|
| 3,553,820 | 1/1971 | Sara | 428/614 |
| 3,616,841 | 11/1971 | Walz . | |
| 3,864,154 | 2/1975 | Gazza et al. | 428/539.5 |
| 3,902,861 | 9/1975 | Gillot et al. | 428/539.5 |
| 3,946,039 | 3/1976 | Walz | 428/310 |
| 3,962,081 | 6/1976 | Yarwood et al. . | |
| 4,608,307 | 8/1986 | Nakano et al. | 428/402 |
| 4,703,020 | 10/1987 | Nakano et al. | 501/86 |

FOREIGN PATENT DOCUMENTS

| 0141388 | 10/1984 | European Pat. Off. . |
| 0150746 | 12/1985 | European Pat. Off. . |
| 1250112 | 11/1960 | France . |
| 1498987 | 10/1967 | France . |
| 2024586 | 8/1970 | France . |
| 2390230 | 5/1978 | France . |
| 1299742 | 11/1969 | United Kingdom . |
| 1603855 | 5/1977 | United Kingdom . |
| 2148270 | 5/1985 | United Kingdom . |

OTHER PUBLICATIONS

English translation of Abstract of French Appln. No. 1 250 112.
English translation of Abstract of French Appln. No. 1 498 987.
Chemical Abstracts, vol. 85, 1978, p. 57, abrege no. 192304p, Columbus, Ohio, US; & JP-A-78 00 263, (DAIKYO CHEMICAL CO. LTD), 05-01-1978.

Primary Examiner—L. Dewayne Rutledge
Assistant Examiner—George Wyszomierski
Attorney, Agent, or Firm—Pollock, Vande Sande & Priddy

[57] ABSTRACT

A composite material comprising an open pore rigid foam of ceramic, metal, carbon or a plastics material and a solid filler material disposed in the cavities of the foam. The solid filler material forms areas on the surface of the composite material defined by the walls of the cavities in the foam. Depending on the material of the foam, the material filling its cavities may be a metal or a plastics material. The composite material, the production of which is also described, has aesthetic qualities which render it particularly suitable for the production of decorative articles.

18 Claims, 1 Drawing Sheet

COMPOSITE MATERIAL

TECHNICAL FIELD OF THE INVENTION

The instant invention relates to a composite material which may be employed in the manufacture of all manner of articles, notably ornamental or decorative articles, in other words articles, of which it is essential that they have a pleasing visual appearance. Such articles may in themselves possess a pleasing appearance or may be designed to give this pleasing appearance to another article with which they are associated in some manner.

DESCRIPTION OF THE PRIOR ART

It is impossible to ennumerate all the articles falling into this category, and the materials used to date in their production.

BRIEF SUMMARY OF THE INVENTION

It is an object of the instant invention to provide a composite material that may in particular be used to produce ornamental articles, the appearance of which is novel and attractive.

Another object of the instant invention is to provide a process for the manufacture of this composite material.

Another object of the instant invention is to provide a decorative article, in particular a watch casing, made from this composite material.

These objects are achieved respectively by the composite material, the process and the decorative article claimed.

BRIEF DESCRIPTION OF THE DRAWINGS

The invention will now be described with reference to the accompanying drawings, in which.

DETAILED DESCRIPTION OF THE INVENTION

Figure 1:
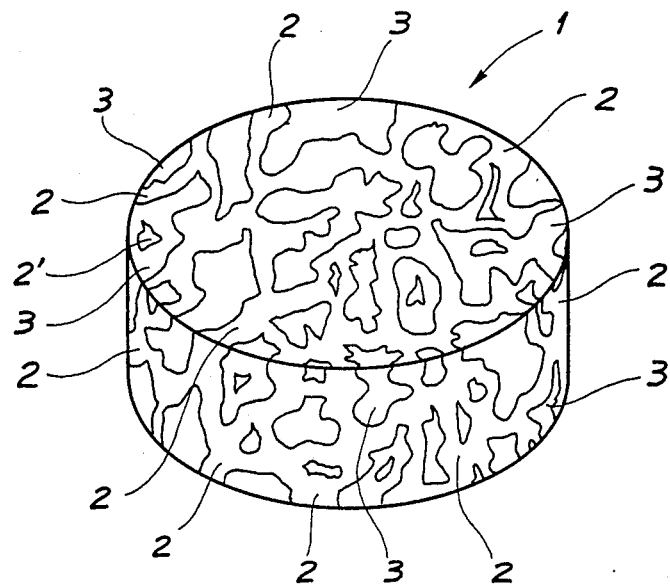
FIG. 1 is a diagrammatic view of a piece of the composite material of the invention.

Numerous substances are known which are designated by the generic term "open pore rigid foams".

Such foams essentially have a rigid three dimensional skeleton, the component parts of which are generally non rectilinear filaments and of variable thickness, and/or generally non planar walls also of variable thickness, pierced by irregularly shaped openings. These component parts are of course themselves rigid and they are linked one to another in such a manner as to delimit cavities which communicate between them and with the outside of the foam.

The skeletal component parts of these foams may be made of a plastics material such as for example the polyurethane forms described in U.S. Pat. No. 3,616,841, the entire contents of which are expressly incorporated herein by reference.

These component parts may also be metallic, such as in the foams described together with a process for their manufacture in for example the aforesaid U.S. Pat. No. 3,616,841.

Amongst the numerous metals which may be used for the production of these foams may be mentioned, by way of example only, aluminum, copper, nickel, silver, steels such as stainless steel, etc. . . .

The skeletal component parts of the open pore rigid foams may also be ceramic, as in the foams described for example together with a process for their production in U.S. Pat. No. No. 3,962,081, the entire contents of which are expressly incorporated herein by reference.

Ceramics which may be used for the product of these foams include for example the oxides of metal such as aluminum or zirconium, mixtures of such oxides, silicon carbide or silicon nitride, etc. . . .

Open pore rigid foams which contain carbon component parts are also known. One such open pore foam material is known as Reticulated Vitreous Carbon (RVC). RVC is a material composed solely of vitreous carbon which, as the name implies, is a form of glass-like carbon which combines some of the properties of glass with some of those of normal industrial carbons. RVC is said to have an exceptionally high void volume (97%) and a high surface area combined with self-supporting rigidity, low resistance to fluid flow, and resistance to very high temperatures in non-oxidizing environments. It is available in a wide range of porosity grades weighing about 3 pounds per cubic foot. RVC is available from Energy Research and Generation, Inc., Lowell & 57th Street, Oakland, Calif. 94608.

It should be noted that the shape and the dimensions of the component parts of the foam skeletons mentioned above, and hence the shape and dimensions of the cavities which are defined by these component parts, are determined by the process used in the production of these foams and that a wide range of processes may be employed. Moreover, these shapes and these dimensions may be substantially constant throughout the volume of the foam, in which case the structure of the foam is termed regular, or may on the contrary vary and even vary quite considerably within this volume, in which case the structure of the foam is termed irregular.

DETAILED DESCRIPTION OF THE DRAWINGS

A piece of composite material of the invention, of arbitrary shape, is shown in FIG. 1 with the reference numeral 1.

This material 1 contains an open pore rigid foam of the type described above.

In this example the structure of the foam is very irregular and the component parts of its skeleton are in the main walls pierced by openings.

It will be made clear below in this specification that the invention is not limited to a composite material containing this type of foam, but that it also extends to composite materials containing foams having a skeleton, the component parts of which are, at least in part, filaments and/or the structure of which is at least substantially regular.

In the example shown in FIG. 1, the intersection of the outer surface of the material 1 with the walls constituting the skeletal component parts of the foam form the network of veins or ribs designated with the numeral 2 which are shown in FIG. 1.

The shape and the dimensions of these ribs 2 clearly depend on the shape and the dimensions of the walls of the foam which are intersected by the outer surface of the material 1 as well as by the shape of this outer surface and of its orientation in relation to that of the said walls.

For reasons that will become evident below, the skeletal component parts of the foam containing material 1 are so dimensioned that at least some of these ribs 2 are easily visible to the naked eye as well as at least some of the spaces which these define on the surface of material 1.

It may be seen from the example shown that in those places where the structure of the foam is very irregular, the shape and dimensions of the ribs 2 are of course also very irregular. It is obvious that this structure could just as well be regular.

The composite material of the invention also contains a solid material which impregnates the above-mentioned rigid foam, in other words which completely, or almost completely, fills the cavities bounded by the walls of this foam.

This material impregnating the foam clearly appears on the surface of the material 1 where it forms areas bounded by the ribs 2. These areas are designated by the reference numeral 3 in FIG. 1.

The shape and the dimensions of these areas 3 are obviously determined by the shape and the dimensions of the ribs 2 which surround them. In the example of FIG. 1 these shapes and these dimensions are naturally very irregular, but they could equally well be substantially regular.

It may be noted that, in the example of FIG. 1, some of the areas 3 totally enclose zones, one of which is designated by the reference numeral 2'. These zones 2' are constituted of the same material as the ribs 2. Depending on circumstances, these may be formed by walls of the skeleton of the foam which, by chance, are not linked to other component parts of this skeleton in the outer surface of the material 1. In other cases it may be the intersection of the outer surface of material 1 with the filaments which form part of the foam skeleton.

It should be noted in this connection that if the major part of the skeleton of the foam is constituted of filaments, the outer appearance of the material of the invention is to some extent inverted in relation to that of the material shown in FIG. 1. In this case, the ribs appearing on the outer surface of the material and the areas which these define are formed respectively by the intersection of this surface with the cavities of the foam and with the skeletal component parts of the latter.

It has been found that the appearance of the composite material which has just been described depends, not only on the nature of the materials used to produce the foam and to fill the cavities in the latter, but also, and to a very large extent, on the dimensions of the ribs 2 and the areas 3. Thus, if the ribs 2, or the majority of these, are so thin that they are not visible to the naked eye and/or if the areas 3, or the majority of these, have such a small surface that they can no longer be seen with the naked eye, the composite material 1 generally has a not very aesthetic appearance, or, at best, an appearance which is simply that of the material of the foam or that of the filling material, depending on which of these materials predominates on the surface of the composite material.

In order to ensure that the latter has the desired aesthetic appearance, it is thus necessary for the zones constituted respectively by the intersection of the exterior surface of the composite material with the skeletal component parts and with the cavities in the foam, in other words the ribs 2 and the areas 3 in the example in FIG. 1, to be readily visible to the naked eye, at least in the case of some of these.

Experience has shown that it is for preference necessary for more than about 10% of the ribs, such as the ribs 2, to have a minimum width of about 0.5 mm and that more than about 10% of the areas defined by these ribs to have no transverse dimension below about 1 mm. Foams having these structural characteristics are available from the manufacturing processes and other sources described in the aforesaid U.S. Pat. Nos. 3,616,841 and No. 3,962,081.

The production of the composite material described hereinabove does not present any particular difficulties. The details of the process used for this production depend on the materials chosen for the foam and for the filling of the latter. Nevertheless, regardless of the nature of these materials, this process always comprises a stage of obtaining the filling material in liquid form, a stage of introducing this filling material in liquid form into the foam, and a stage of solidifying this filling material.

If the filling material is a plastics material which is supplied in liquid form by its manufacturer, such as an epoxy or acrylic resin, it naturally does not require special treatment before being introduced into the foam, except possibly for the mixing of its components.

If the filling material is a thermoplastic material such as a polystyrene or a polymethylmethacrylate (PMMA), it must obviously be heated at least up to its melting point before being introduced into the foam.

The same applies if the filling material is a metal.

Several physical characteristics of the foam and of the filling material determine the most suitable method for introducing the filling material into the foam.

Of these characteristics, mention may be made of the viscosity and surface tension of the filling material when this is in its liquid state, the dimensions of the cavities of the foam and of the openings which communicate between them and with the outside of the foam, the wetability of the material of this foam by the filling material in liquid form, etc. . . .

If the filling material in liquid form is of low viscosity and if it easily wets the material of the foam and if the cavities of this foam as well as the openings which communicate between them and with the outside of the foam are relatively large, the filling material in liquid form can simply be poured onto the foam after the latter has been placed in a suitable receptacle.

In the same conditions, the foam may be plunged into a bath containing the filling material in liquid form and removed from said bath after this filling material has filled the cavities in the foam.

If the filling material in liquid form does not sufficiently wet the foam material, it is possible to submit the latter to prior treatment designed to improve its wetability.

Thus, for example, it is possible to improve the wetability of a ceramic foam by a metal in its liquid state by previously soaking the foam in a solution of a suitable organometallic compound.

If the viscosity of the filling material in liquid form is too high to enable the simple methods described above to be used, and/or if the dimensions of the cavities of the foam and the openings which link them are too low, it is possible to place the foam in an appropriate receptacle, to pour the filling material in liquid form onto this foam and to apply pressure to said filling material, for example via a piston adapted to fit the receptacle.

All the above-described operations may be preceded by a evacuation of the foam in such a way that the air which normally fills the latter's cavities is removed before introduction of the filling material.

Similarly, the foam may be subjected to percussion or to vibration during these operations in order to facilitate and improve the penetration of the filling material into the cavities of the foam.

If the filling material normally exists in solid form and has to be heated in order to become liquid, as in the case of thermoplastic materials or metals, it is possible to combine the stages of liquefaction of this material with introduction of the latter into the foam. To do so, it suffices to place the foam and the filling material, in solid form, in the same recipient, the latter being for preference placed on the foam. The recipient containing the foam and the filling material is placed in a suitable furnace, the temperature of which is raised at least up to the melting point of the filling material. The latter, being then in its liquid state, flows and penetrates the cavities of the foam. All the operations designed to facilitate penetration of the filling material into the cavities of the foam which have been mentioned hereinabove may obviously also be employed in this case.

If the filling material is a metal, the above-mentioned furnace may be an induction furnace.

Once the filling material has been introduced into the cavities of the foam, it is solidified in a manner depending on its nature.

If this filling material is a plastics material which is supplied by its manufacturer in liquid form, its solidification results, in conventional manner, from a polymerisation process which is initiated, for example, by mixing the components of this plastics material and/or by heating this material up to a predetermined temperature.

If this filling material is a thermoplastic material or a metal, its solidification obviously results from its cooling.

The fact that the filling material is introduced in liquid form into the cavities of the foam imposes certain limitations on the choice of the materials that may be used to manufacture the material of the invention.

It is, indeed, necessary that the filling material, when in the liquid state, does not destroy the foam.

Generally speaking, this condition is fulfilled when the temperature of the filling material in its liquid state is lower than the temperature at which the foam begins to be destroyed, for example by melting or softening of its skeletal structure.

Thus, if the foam consists of a thermoplastic material, the filling material can virtually only be a metal or alloy of low melting point or another plastics material. This latter may be another thermoplastic material having a melting point that is lower than that of the foam material, or a plastics material which is liquid in the state in which it is supplied by its manufacturer and which hardens by cold polymerization or with a relatively small rise in its temperature.

For example, if the material of the foam is a polyurethane, the melting point of which is about 180° C., the filling material may be the eutectic alloy of tin and indium, the melting point of which is about 120° C., or the alloy of bismuth, lead, tin and cadmium which is known under the name of Wood's metal and the melting point of which is about 70° C.

In this same example, the filling material may be cellulose tricaprylate which is a thermoplastic material having a melting point of 116° C. as described in the second edition of the *Polymer Handbook* by Brandrup and Immergut (J. Wiley, New York, 1975), the entire contents of which are expressly incorporated herein by reference. The filling material also may be an epoxy or acrylic resin sold in liquid form and hardening at low temperature. A polyurethane foam filled with such a plastic filling material may be particularly useful as the middle of a low-cost watch case.

If the foam material is metal, the filling material may obviously be any plastics material or another metal having a melting point below that of the foam material. In this latter case, one must in addition ensure that the two metals are not excessively mutually soluble. Moreover, these two metals may not be too far removed from each other in the electrochemical series of metals in order to ensure that the material of the invention has good corrosion resistance.

If, for example, the foam is aluminum, the melting point of which is about 660° C., the filling material may be any of the low melting point alloys mentioned hereinabove, or any of the plastic materials also mentioned hereinabove. This filling material may also be a polyester or a polystyrene, the melting points of which are clearly below that of aluminum. This filling material may also be lead, the melting point of which is 327° C., or tin, the melting point of which is 232° C.

If the foam is gold, the melting point of which is 1064° C., all the materials mentioned hereinabove may obviously be used as filling material.

In addition, this latter may be silver, the melting point of which is 960° C.

If the foam is platinum, the melting point of which is 1755° C., the filling material may moreover be gold or copper, the temperatures of fusion of which are 1064° C. and 1084° C. respectively.

If the foam material is made of carbon, the filling material may also be a plastics material or a metal. In the latter case, one must, however, ensure that the corrosion potential of the metal is not too different from that of the carbon in the electrochemical series, once again to ensure that the material of the invention has good resistance to corrosion. The condition is in particularly fulfilled if the filling material is gold or stainless steel.

If the material of the foam is ceramic, there is virtually no limitation in the choice of the filling material. A ceramic foam filled with gold may be particularly useful as the middle of an expensive watch case.

It may be seen that the appearance of the material of the invention may be infinitely varied since the appearance depends on the color and the nature of the materials chosen for the foam and also to fill the cavities therein and on the shape and the dimensions of the skeletal component parts of said foam and of the cavities defined by these component parts.

It may be noted in this connection that it is well known that the colour of plastics materials may be modified by mixing pigments into them. It is also well known that the colour of certain ceramics, for example, of aluminium oxide, may be modified by introducing traces of metal into these ceramics during their manufacture.

The material of the invention may also be manufactured by using materials of different colours or of similar colours but in different shades, or also materials one of which is shiny, the other matt, etc. . .

The composite material of the invention lends itself without difficulty to manufacture into any article whatsoever. Nevertheless the aesthetic properties of this material obviously render it particularly suitable for manufacture into a decorative article.

This article may be machined into a block of the material according to the invention having the desired dimensions with the aid of conventional machines and tools, naturally depending on the material of the foam and of the filling material.

It may be of advantage to give the foam the shape and the dimensions of the finished article before introducing the filling material into its cavities. If necessary one can give the foam dimensions that are slightly above those of the finished article in order to be able to carry out finishing operations, such as polishing, after the filling material has been introduced into the cavities in the foam.

This procedure avoids losses which may be expensive, especially if the filling material is a precious metal such as gold, silver or platinum.

Figure 2:
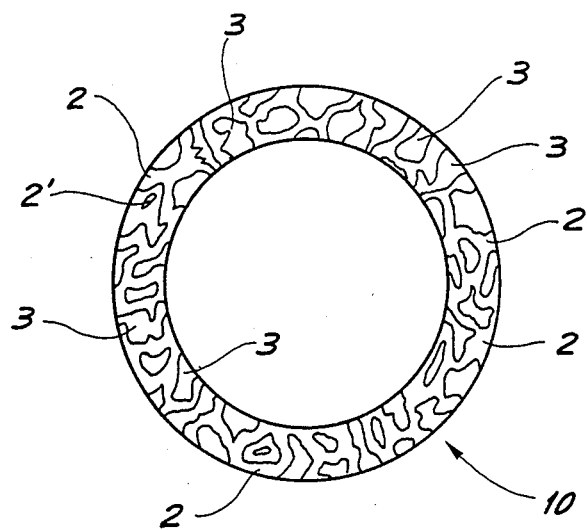
FIG. 2 represents a case band of a watch casing made out of the composite material of the invention.

FIG. 2 shows a watch casing component part as a non limiting example of a decorative article produced using the material of the invention.

In this example this watch casing component part, designated by the reference numeral 10, is a case band exterior in the shape of a ring designed to enclose a case band interior executed in a material devoid of special aesthetic qualities but perhaps lending itself more easily than the material of the invention to tooling of a more or less complicated nature required for fixing the movement, the glass and the base of the watch.

This case band interior, the movement, the glass and the base of the watch have not been shown since these component parts and the manner of their assembly to each other as well as to the case band exterior 10 are well known, notably in patent application EP-A-No. 0 150 746, the entire contents of which are expressly incorporated herein by reference.

There are visible on FIG. 2 the ribs 2 and the areas 3 respectively formed on the surface of the case band 10 by the walls of the foam and by the material filling the cavities of said foam. Also visible in this FIG. 2 are some zones such as zone 2', which are similar to the zones 2' of FIG. 1.

It should be mentioned that the material of the invention is equally well suited to the manufacture of case bands of different shapes onto which the movement, the glass and/or the base may be fitted directly. These case bands may also comprise horns designed for the fitting of a bracelet in a conventional manner.

We claim:

1. A composite material comprising an open pore rigid foam made of a first solid material and having a rigid three dimensional skeleton comprising a network of rigid component parts linked one to another to define cavities which communicate one to another and with the outside of the foam, and a second solid material disposed in the cavities of said foam, wherein said component parts and said cavities are so dimensioned that the zones constituted by the intersection of an outer surface of said composite material with said component parts and said cavities respectively are readily visible and may be distinguished sufficiently from each other by the naked eye to provide an aesthetic appearance, wherein said second material has a liquid state in the presence of said foam which does not destroy said foam and allows said second material to be introduced into said cavities and then solidified to fix said second material relative to said first material, and wherein said first and second solid materials together provide a solid composite material suitable for manufacturing an ornamental article.

2. A composite material according to claim 1, wherein said first material is a ceramic.

3. A composite material according to claim 1, wherein said first material is carbon.

4. A composite material according to claim 1, wherein the said first material is a metal.

5. A composite material according to claim 1, wherein said first material is a plastics material.

6. A composite material according to any one of the claims 1 to 5, wherein said second material is a plastics material.

7. A composite material according to any one of the claims 1 to 5, wherein said second material is a metal.

8. A composite material according to claim 1, wherein said component parts are non-rectilinear filaments of variable thickness and define cavities providing irregular shaped areas in an outer surface of the composite material.

9. A composite material according to claim 1, wherein more than about 10% of said component parts have a minimum width of about 0.5 mm and more than about 10% of the cavities have a transverse dimension of at least about 1 mm.

10. A composite material according to claim 1, wherein said cavities are substantially full of said second material.

11. A composite material according to claim 1, wherein said first and second materials provide a solid composite material suitable for a watch case component.

12. A composite material according to claim 8, wherein said first and second materials provide a solid composite material suitable for a case band exterior of a watch.

13. A composite material according to claim 1, wherein said first and second materials provide a solid composite material machinable by conventional machines and tools.

14. A composite material according to claim 1, wherein said first and second materials provide a solid composite material having good resistance to corrosion.

15. A composite material which includes an open pore rigid foam made of a first solid material and having a rigid three dimensional skeleton comprising a network of rigid component parts linked one to another to define cavities which communicate one to another and with the outside of the foam, and a second solid material disposed in the cavities of said foam, said second material having a liquid form in the presence of said foam which does not destroy said foam, and said composite material being made by a process comprising obtaining the second material in said liquid form, introducing the second material into the cavities of the foam while the second material is in said liquid form, and solidifying the second material after said introduction to fix said second material relative to said first material, said component parts and said cavities being so dimensioned that the zones constituted by the intersection of an outer surface of said composite material with said component parts and said cavities respectively are readily visible and may be distinguished sufficiently from each other by the naked eye to provide an aesthetic appearance, and said first and second solid materials together provide a solid composite material suitable for manufacturing an ornamental article.

16. A composite material according to claim 15, wherein said introduction comprises the application of pressure on said second material in its liquid form.

17. A composite material according to claim 15, wherein the foam is evacuated prior to said introduction.

18. A decorative article made at least in part of a composite material comprising an open pore rigid foam made of a first solid material and having a rigid three dimensional skeleton comprising a network of rigid component parts linked one to another to define cavities which communicate one to another and with the outside of the foam, and a second solid material disposed in the cavities of said foam, wherein said component parts and said cavities are so dimensioned that the zones constituted by the intersection of an outer surface of said composite material with said component parts and said cavities respectively are readily visible and may be distinguished sufficiently from each other by the naked eye to provide an aesthetic appearance, wherein said second material has a liquid state in the presence of said foam which does not destroy said foam and allows said second material to be introduced into said cavities and then solidified to fix said second material relative to said first material, and wherein said first and second solid materials together provide a solid composite material suitable for manufacturing an ornamental article.

* * * * *